United States Patent [19]

Rowlette et al.

[11] Patent Number: 5,034,848
[45] Date of Patent: Jul. 23, 1991

[54] LOW PRESSURE SENSOR

[75] Inventors: Mitchell R. Rowlette, Berea; Werner Strasser, Lexington; Youn H. Ting, Lexington; Tim H. McMains, Lexington, all of Ky.

[73] Assignee: Texas Instruments Incorporated, Dallas, Tex.

[21] Appl. No.: 451,326

[22] Filed: Dec. 19, 1989

[51] Int. Cl.$^5$ ................................................. G01L 9/12
[52] U.S. Cl. ........................................ 361/283; 73/718
[58] Field of Search .................... 361/283; 73/718, 724

[56] References Cited

U.S. PATENT DOCUMENTS

| | | | |
|---|---|---|---|
| 3,405,559 | 10/1968 | Moffatt | 361/283 X |
| 4,177,680 | 12/1979 | Coleman | 361/283 X |
| 4,612,812 | 9/1986 | Broden | 361/283 X |
| 4,680,971 | 7/1987 | Kavli et al. | 73/718 |
| 4,716,492 | 12/1987 | Charboneau et al. | 361/283 |

Primary Examiner—Donald A. Griffin
Attorney, Agent, or Firm—John A. Haug; James P. McAndrews; Melvin Sharp

[57] ABSTRACT

Differentially connected capacitive sensors are mechanically coupled with the flexible capacitor plate of one sensor coupled to the source of pressure to be measured, the flexible capacitor plate of the other sensor coupled to ambient pressure. In a second embodiment, inaccuracies due to forces on the flexible plate are minimized by providing a housing with a tapered inner wall, an O-ring and a support to apply a radial load to the sensor due to clamping action from the tapered housing against the O-ring to provide a seal for the pressure sensing chamber. In a further embodiment, the cost of fabrication of the pressure transducer is minimized by providing the housing as a one piece cup. The electronics are mounted on the exterior surface of the low pressure side of the ceramic capacitor pressure sensing element and sealed in thereat by potting with an epoxy. In addition, an electrical pin connector from the electronics and a vent to the low pressure surface of the movable plate are secured in the potting material and extend externally thereof. In a further embodiment, pressures applied to the movable diaphragm of the pressure sensing element by the gasket are eliminated by providing a ceramic capacitor having a movable diaphragm element having smaller length and width dimensions than the fixed capacitor substrate. The gasket is positioned around the movable diaphragm element and on the fixed capacitor plate with the housing being stepped to apply a force against the gasket but remain out of contact with the movable diaphragm element.

15 Claims, 3 Drawing Sheets

LOW PRESSURE SENSOR

BACKGROUND OF THE INVENTION

1. FIELD OF THE INVENTION

This invention relates to pressure sensors having therein transducers for operation in low pressure (i.e., about 1 to 5 inches of water) environments and, more specifically, to such pressure sensors having capacitive pressure transducers.

2. BRIEF DESCRIPTION OF THE PRIOR ART

Pressure sensing devices using capacitive pressure transducers are well known and have received substantial acceptance. An example of such prior art pressure sensing devices is set forth in the patent of Charboneau et al. (U. S. Pat. No. 4,716,492).

While such prior art pressure sensing devices using capacitive pressure transducers provide good results and at reasonable cost, it is always desirable to improve the accuracy of such devices as well as to diminish the cost of fabrication.

In such prior art transducers using a single fixed substrate and a flexible diaphragm, there is no allowance for a true gauge pressure measurement. Furthermore, inaccuracies in result are provided due to the sealing of about 6 psia between the diaphragm and the substrate. While it is readily apparent that a true gauge pressure can be provided by opening the space between the diaphragm and the substrate to atmospheric pressure, this approach has also caused problems. As pressure greater than atmospheric pressure is applied to the flexible diaphragm, the diaphragm moves toward the fixed substrate. Since two silver plates are deposited, one on the substrate and one on the diaphragm, a variable capacitor is created. The major disadvantage to this approach is therefore that atmospheric contaminants, such as chlorine and hydrogen sulfide, will damage the silver plates, thereby ultimately rendering the device non-functional.

A further problem encountered in pressure sensors of the above described type is that extraneous axial pressures applied to either or both of the plates of the capacitive transducer can cause inaccuracies in the actual pressure measurement. Such extraneous pressures often result from pressures applied to one or both of the capacitive transducer elements by the housing for the sensor itself.

A yet further problem encountered in pressure transducers of the above described type is that it is desirable to minimize the cost of fabrication. A cause of higher fabrication cost is the use of a separate printed board for the electronics required to provide an appropriate electrical indication of the sensed pressure.

A still further problem encountered in the pressure transducers of the above described type is that forces from the packaging or housing are applied to the movable diaphragm through the gasket, thereby providing an extraneous axial pressure to the movable diaphragm which results in inaccuracies in measurement.

SUMMARY OF THE INVENTION

In accordance with the present invention, the above noted problems of prior art pressure sensors of the type noted hereinabove are minimized.

Briefly, the inaccuracies caused by the build up of pressure between the capacitor plates is minimized by providing a pair of identical, differentially connected together capacitive sensors, mechanically fixed together, with the flexible capacitor plate of only one of the sensors communicating with the source of pressure to be measured. The flexible capacitor plate of the other sensor is preferably in communication with ambient pressure. Since the sensors are identical and mechanically coupled, errors due to temperature, vibration, shock sound waves, etc. in addition to the problem caused by the build up of pressure between the capacitor plates are essentially cancelled due to the differential connection of the sensors.

The inaccuracies caused by the clamping of the housing elements about the pressure sensor are minimized by applying a load to the sensor from the housing in a radial as opposed to an axial direction. The construction comprises a housing with a tapered inner wall, an O-ring and a support. The clamping action from the tapered housing squeezes the O-ring against the side of the thick substrate of the ceramic sensor and provides a seal for the pressure sensing chamber. Since the force from the O-ring to the sensor is radially applied, the clamping will not affect the movement of the sensor and thus no calibration shift will occur. A built-in ridge at the base of the sensor engages with the O-ring and secures the sensor in place against the support. An air gap between the sensor and the housing insures no axial stress to the sensor.

The cost of fabrication of the pressure transducer of the prior art is minimized in accordance with another embodiment of the invention by providing the housing as a one piece cup of plastic or stainless steel. The electronics are mounted on the exterior surface of the low pressure side of the ceramic capacitor pressure sensing element and sealed in thereat by potting with an epoxy or any structural adhesive. In addition, an electrical pin connector from the electronics is secured in the potting material and extends externally thereof for external connection to the electronics. Also, a low pressure vent to the low pressure surface of the movable capacitor plate of the ceramic capacitor extends through the fixed capacitor plate and the potting material in which it is secured.

In addition, pressures applied to the movable diaphragm of the pressure sensing element by the gasket of the prior art is eliminated by providing a ceramic capacitor having a movable diaphragm element having smaller length and width dimensions than the fixed capacitor substrate. The sealant is positioned around the movable diaphragm element and on the fixed capacitor plate with the housing being stepped to make contact with the sealing material but remain out of contact with the movable diaphragm element.

BRIEF DESCRIPTION OF THE DRAWINGS

FIG. 5b is a cross sectional view of a portion of the transducer of FIG. 5a during fabrication;

FIG. 5c is a cross sectional view of an enlarged view of a portion of the transducer of FIG. 5a;

DESCRIPTION OF THE PREFERRED EMBODIMENTS

Figure 1:
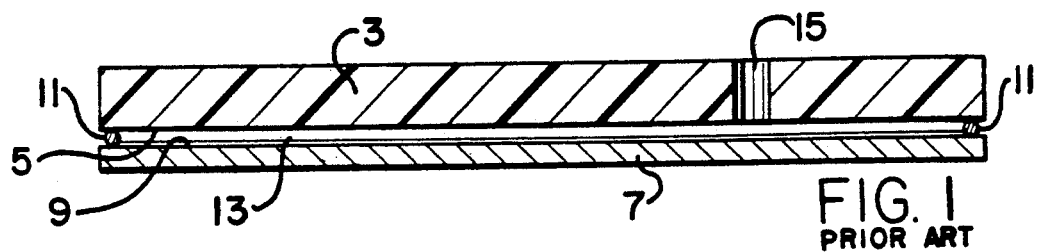
FIG. 1 is a diagram of the sensor portion of a typical prior art capacitive pressure transducer.

Referring first to FIG. 1, there is shown a diagram of the sensor portion of a typical prior art capacitive pressure transducer. The transducer 1 includes a fixed substrate 3 having a layer of silver 5 deposited on one surface thereof forming a first capacitor electrode. A flexible diaphragm 7 having a layer of silver 9 deposited on the surface thereof facing the layer 5 forming a second capacitor electrode is spaced from the fixed substrate 3 and layer 5 by spacer 11 to form an enclosed space 13 therebetween. The electrodes form the plates of a capacitor wherein the capacitance varies with movement of the flexible diaphragm. The space 13 is vented to the atmosphere by an opening 15 in the fixed substrate 3.

As pressure greater than atmOspheric pressure is applied to the flexible diaphragm, the diaphragm moves toward the fixed substrate. Since the two silver plates are deposited on the substrate and diaphragm, a pressure variable cap is created. The major disadvantage to this approach is that atmospheric contaminants will damage the silver plates, rendering the device non-functional.

In accordance with a first embodiment of the present invention which minimizes the problems inherent in the prior art pressure transducer of the type described above, as shown in FIG. 2, there is provided a sensor having two transducer elements 21 and 23 similar to the transducer of the prior art described above, both of which are open to the atmosphere as in the prior art described above. Both transducer elements are then sealed at atmospheric pressure, such as by press fit metal pins, glued ceramic pins, sealing with low melt temperature glass and the like. The transducer elements 21 and 23 are positioned so that the fixed substrate 3 of each of the transducer elements is positioned to face each other and are spaced from each other by ceramic sealing pins 25 secured in an aperture 27 in each of the fixed substrates 5 to form a space 26 therebetween. The pins 25 can provide the sealing of the opening 15 and, in any event, does not permit communication of the environment with the enclosed space 13. The silver electrodes are then connected together to provide a capacitive arrangement as shown in FIG. 3.

The dual transducer design described above creates a true differential transducer which enables true gauge measurement at low pressures. In addition, reliability concerns due to contamination of the silver capacitor plates are eliminated. Also, since both elements 21 and 23 of the dual transducer are the same and mechanically fixed together, errors due to temperature, vibration, shock, sound waves and the like are minimized.

Figure 2:
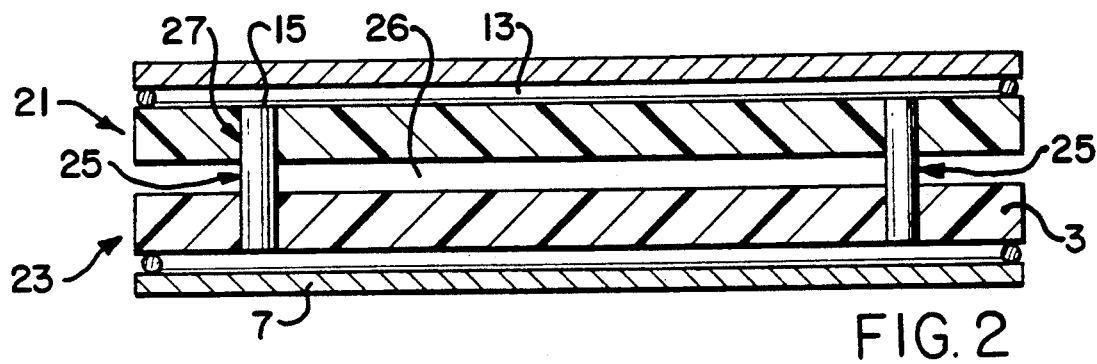
FIG. 2 is a diagram of the sensor portion of a capacitive pressure transducer in accordance with a first embodiment of the present invention.
Figure 3:
FIG. 3 is a circuit diagram of the electrical arrangement of the element of FIG. 2.
Figure 4:
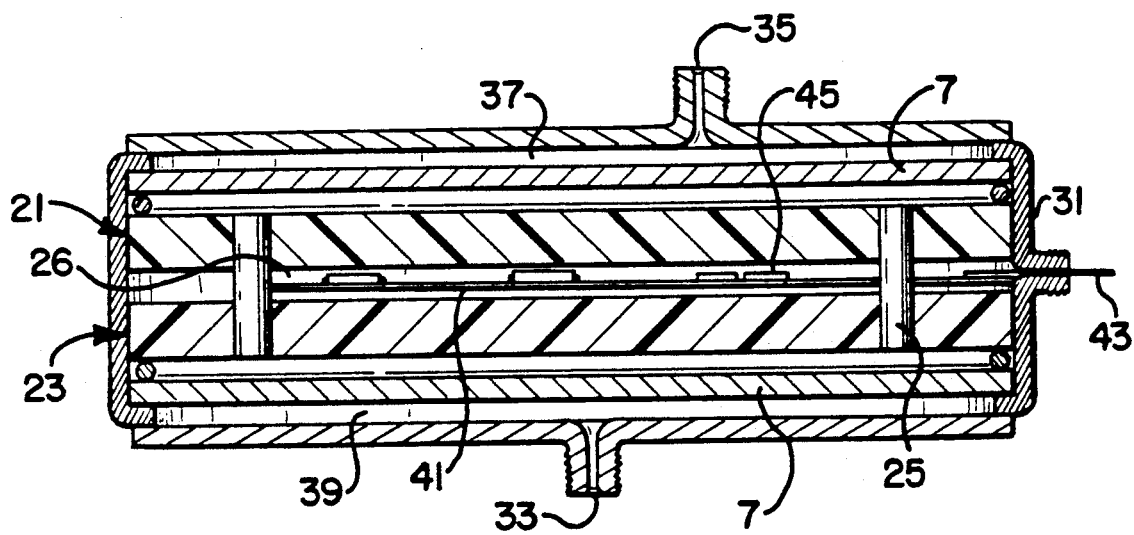
FIG. 4 is a cross section of a capacitive transducer with the sensor portion of FIG. 2.

A pressure sensor using the dual differential transducer of FIG. 2 is set forth in FIG. 4. The sensor includes a housing 31 having an inlet port 33 for receiving therein the medium under pressure which is to be measured and an inlet port 35 vented to atmospheric or ambient pressure. The ports 31 and 33 are hermetically sealed from each other by the dual differential pressure transducer of FIG. 2 which is secured within the housing 31. As can be seen, the chamber 37 communicating with the inlet port 35 is formed by the flexible layer 7 of transducer 21 and the housing 31 whereas the chamber 39 communicating with the inlet port 33 is formed by the flexible layer 7 of transducer 23 and the housing 31. Furthermore, a printed circuit or wiring board 41 is secured in the space 26 with appropriate electrical leads or terminals 43 extending externally of the housing 31 for connection to an external device. The leads or terminals 43 extend out of the housing 31 in hermetically sealed relationship therewith. In addition, electronic circuitry 45 is provided on the board 41, this circuitry being coupled in appropriate and known manner to the electrodes of each of the transducers 21 and 23 as well as to the leads or terminals 43.

Figure 5A:
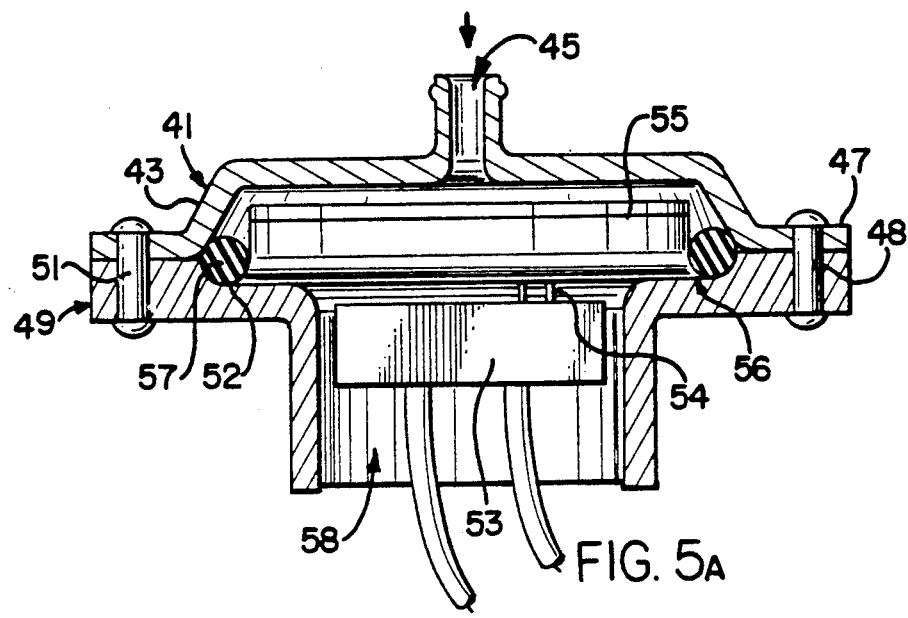
FIG. 5a is a cross sectional view of a capacitive pressure transducer in accordance with a second embodiment of the present invention.
Figures 5B, 5C:
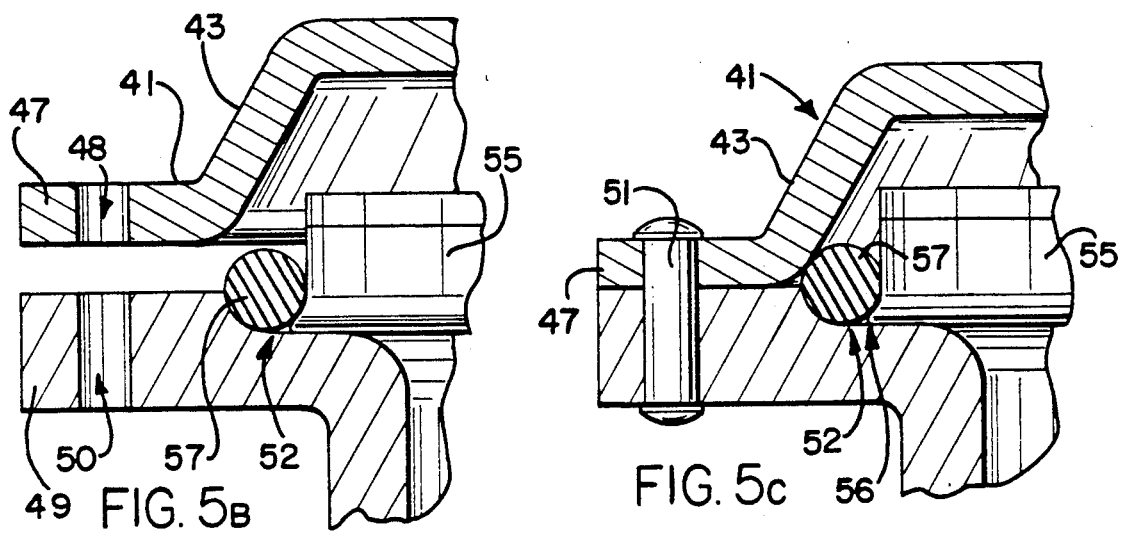

Referring now to FIGS. 5a, 5b and 5c there is shown a second embodiment of the present invention. The pressure transducer in accordance with this embodiment is designed to measure ultra low pressures in the range of from about 0 psi to about 0.2 psi. In accordance with this embodiment, there is provided a housing 41 having oblique side walls 43, a fluid inlet 45 which is coupled to the fluid whose pressure is to be measured and a flange portion 47 having apertures 48 therethrough. The housing 41 is connected to a support 49 having apertures 50 mating with the aperture 48 in the flange portion 47 for receiving a rivet 51 which secures the housing and support to each other. The support 49 also includes a depression 52 for receiving an O-ring 57 therein and a central aperture 58 for housing therein electronics 53. A sensor 55 generally of the type disclosed hereinabove in FIGS. 1 or 4 and having a ridge 56 at the base thereof is disposed to rest on the support 49, is spaced from the housing 41 by the O-ring 57 and is connected to electronics 53 via conductors 54.

The embodiment of FIG. 5a is assembled as shown in FIG. 5b by initially placing the O-ring 57 in the depression 52 and placing the sensor 55 within the O-ring on the support 49. The housing 41 is then disposed over the sensor 55 with the apertures 48 in the flange portion 47 thereof mating with the apertures 50 in the support 49. As the oblique walls 43 of the housing 41 move toward support 49, they impinge against the O-ring 57 and force the O-ring against the ridge 56 on the sensor as well as against the support to provide an hermetic seal among these elements as shown in FIG. 5c. Since the force from the O-ring 57 is radially applied, the clamping will not affect the movement of the sensor and thus no calibration shift will occur. The air gap between the sensor 55 and the housing 41 insures no axial stress being applied to the sensor.

Figure 6:
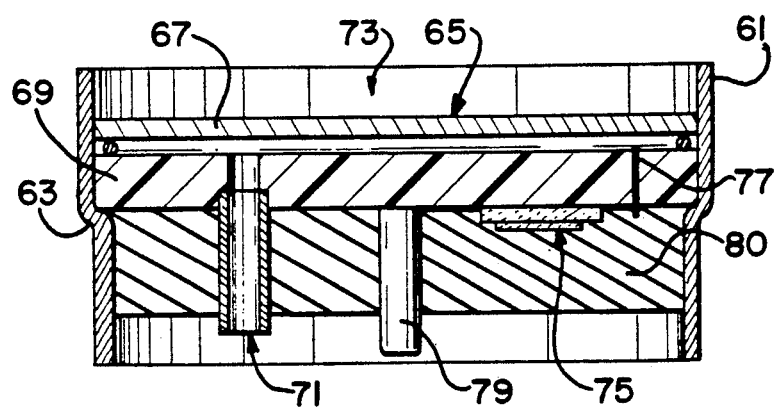
FIG. 6 is a cross sectional view of a capacitive pressure transducer in accordance with a third embodiment of the present invention.

Referring now to FIG. 6, there is shown a third embodiment of the present invention. This embodiment includes a housing or cup 61, preferably formed of plastic or stainless steel, having an indentation 63 therein. Disposed within the cup 61 and against the indentation 63 is a ceramic capacitor pressure sensing element 65, preferably of the type shown in FIG. 2, which is secured hermetically in the cup by an epoxy. The flexible portion 67 of the element 65 faces the high pressure opening of the cup 61 whereas the fixed portion 69 thereof faces the low pressure side thereof. A low pressure port 71 extends from the low pressure side of the cup 61 to the space 73 between the portions 67 and 69. The electronics 75 is secured to the fixed portion 69 at the low pressure surface thereof with a pin connection 77 extending from the electrodes of the capacitor of the sensing element 65 to the electronics. In addition, a pin connector 79 extends outwardly from the fixed portion 69 and is also connected to the electronics 75. The entire exposed surface of the fixed portion 69 is covered with a sealant 80 in which is embedded the electronics and part of the connector 79 and port 71. No mechanical pressure is applied to the diaphragm by the package, thereby reducing the risk of zero pressure shift.

Figure 7:
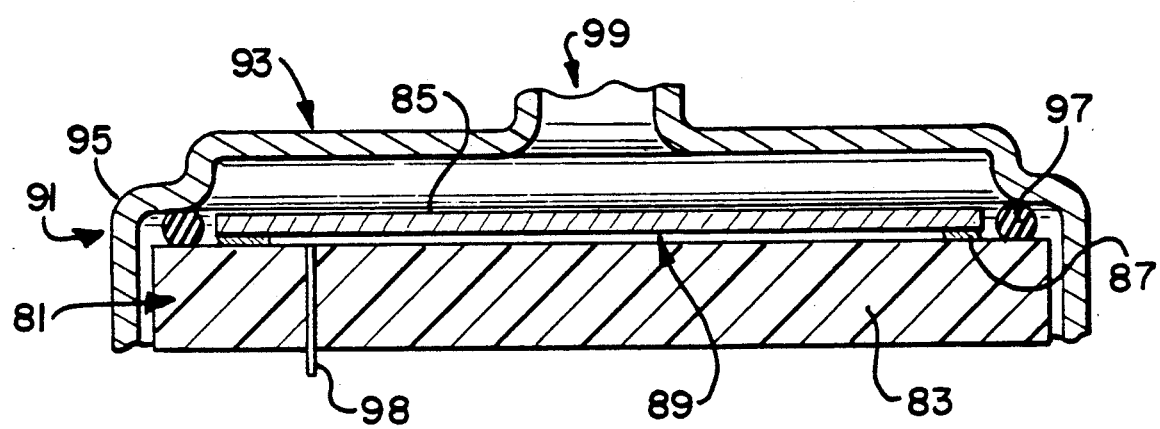
FIG. 7 is a cross sectional view of a capacitive pressure transducer in accordance with a fourth embodiment of the present invention.

Referring now to FIG. 7, there is shown a fourth embodiment of the present invention. In this embodiment, the sensor 81 is formed with a ceramic substrate 83 having an electrode surface thereon and a flexible element 85 having an electrode surface thereon facing the electrode surface on the substrate 83. The flexible element 85 is spaced from the substrate 83 by a glass seal 87 which forms an hermetically sealed chamber 89 therebetween and 85 has a smaller width dimension than the substrate 83, thereby forming a step 91. Leads 98 from the electrode surfaces on the elements 83 and 85 extend through the ceramic substrate 83 for connection to external electronic circuitry. The housing or package 93 includes a step 95 therein for securing an O-ring or gasket 97 thereunder and in the step 91 on the substrate as well as an inlet 99 for receiving the fluid under pressure to be measured. This arrangement eliminates the force applied by the O-ring 97 to the flexible element 85 in the prior art wherein the O-ring is disposed under the housing and on the surface of the flexible element and thereby provides the precision required in low pressure measurement in the range of about 0 to about 0.1 psig.

Though the invention has been described with respect to specific preferred embodiments thereof, many variations and modification will immediately become apparent to those skilled in the art. It is therefore the intention that the appended claims be interpreted as broadly as possible in view of the prior art to include all such variations and modifications.

We claim:

1. A pressure sensor comprising:
   (a) a first capacitive pressure transducer comprising a rigid substrate and a movable diaphragm spaced from each other with a sealed space therebetween having a selected pressure level therein;
   (b) a second capacitive pressure transducer comprising a rigid substrate and a movable diaphragm spaced from each other with a sealed space therebetween having said selected pressure level therein;
   (c) said rigid substrates of said first and second transducers being secured in fixed position relative to each other;
   (d) means connecting said first and second transducers to an electronic circuit; and
   (e) housing means hermetically sealed relative to said first and second transducers to expose the movable diaphragm of the first and second transducers to respective different pressure zones to provide an output signal from the electronic circuit representing differential pressure between the zones independent of said selected pressure.

2. A pressure sensor as set forth in claim 1, further including a first fluid inlet port formed in said housing means communicating with said movable diaphragm of said first transducer and a second fluid inlet port formed in said housing means communicating with said movable diaphragm of said second transducer having said rigid substrate of the first and second transducers secured in spaced relation to each other, and having said electronic circuit disposed within the housing between said rigid substrates.

3. A pressure sensor as set forth in claim 1 wherein said rigid substrate and said movable member of each of said first and second transducers each has an electrode thereon to form a variable capacitor, said capacitors are serially connected together to provide said output signal independent of said selected pressure.

4. A pressure sensor comprising:
   (a) a support;
   (b) a capacitive pressure transducer disposed on said support;
   (c) an O-ring disposed on said support surrounding said pressure transducer; and
   (d) a housing having a tapered side wall and spaced from said transducer secured to said support, said side wall applying a radial force to said O-ring to force said O-ring against said transducer to provide an hermetic seal among said housing, said support, said O-ring and said transducer, a depression being formed in said support and said O-ring and said transducer being disposed in said depression.

5. A pressure sensor as set forth in claim 4 further including a fluid inlet port in said housing communicating with said transducer.

6. A pressure sensor as set forth in claim 5 wherein said support includes a hollow region beneath said transducer and electronic circuit means disposed in said hollow region and coupled to said transducer.

7. A pressure sensor as set forth in claim 4 wherein said support includes a hollow region beneath said transducer and electronic circuit means disposed in said hollow region and coupled to said transducer.

8. A pressure sensor comprising:
   (a) a housing having a pair of opposing open ends;
   (b) a capacitive pressure transducer having a movable diaphragm and a rigid substrate spaced from each other and hermetically sealed in said housing, said flexible diaphragm facing one of said open ends;
   (c) an electronic circuit disposed on said rigid substrate and facing the other of said open ends;
   (d) potting means disposed on the exposed portion of said rigid substrate facing the other of said open ends encasing said electronic circuit therein;
   (e) conductor means coupling said transducer to said electronic circuit; and
   (f) connector means connected to said electronic circuit and extending through said potting means.

9. A pressure sensor as set forth in claim 8 further including a pressure port extending to the space between said movable diaphragm and said rigid substrate and extending through said potting means.

10. A pressure sensor as set forth in claim 9 further including a ridge in said housing intermediate said open ends thereof, said transducer being disposed on said ridge.

11. A pressure sensor as set forth in claim 8 further including a ridge in said housing intermediate said open ends thereof, said transducer being disposed on said ridge.

12. A pressure sensor comprising:
   (a) a pressure transducer comprising a rigid substrate having a first electrode formed on a surface thereof and a movable diaphragm having a second electrode formed thereon spaced from and facing said first electrode;

(b) said movable diaphragm have a width dimension less than said substrate to form a step therewith;
(c) a gasket disposed on said step; and
(d) a housing having a step formed therein substantially conforming to said step between said substrate and said diaphragm to form an hermetic seal among said housing, said gasket and said substrate.

13. A pressure sensor as set forth in claim 12, further including an inlet fluid port formed in said housing communicating with said movable diaphragm, said hermetic seal isolating said inlet fluid port from said substrate.

14. A pressure sensor as set forth in claim 13 further including electrical conductor means coupled to said transducer and extending externally of said substrate.

15. A pressure sensor as set forth in claim 12 further including electrical conductor means coupled to said transducer and extending externally of said substrate.

* * * * *